United States Patent
Yoshikawa et al.

(10) Patent No.: US 12,240,310 B2
(45) Date of Patent: Mar. 4, 2025

(54) FLOOR STRUCTURE

(71) Applicant: TOYOTA JIDOSHA KABUSHIKI KAISHA, Toyota (JP)

(72) Inventors: Masayuki Yoshikawa, Toyota (JP); Kenichi Ichinose, Toyota (JP); Hiroyuki Nishimura, Toyota (JP); Michio Yasunishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 17/730,694

(22) Filed: Apr. 27, 2022

(65) Prior Publication Data

US 2022/0348067 A1 Nov. 3, 2022

(30) Foreign Application Priority Data

Apr. 30, 2021 (JP) ................. 2021-077801

(51) Int. Cl.
 *B60K 1/04* (2019.01)
 *B62D 25/20* (2006.01)

(52) U.S. Cl.
 CPC ............ *B60K 1/04* (2013.01); *B62D 25/2009* (2013.01); *B60K 2001/0438* (2013.01)

(58) Field of Classification Search
 CPC .............. B60K 1/04; B60K 2001/0438; B62D 25/2009; B62D 25/2018; B62D 25/20; Y02T 10/70; H05K 9/009; H05K 9/0081; H05K 9/0088; H05K 9/0084; H05K 9/0066; H05K 9/00; B29K 2995/0002
See application file for complete search history.

(56) References Cited

U.S. PATENT DOCUMENTS

| | | | | |
|---|---|---|---|---|
| 5,501,289 | A * | 3/1996 | Nishikawa | B60K 1/04 280/783 |
| 9,180,916 | B2 * | 11/2015 | Nishida | B62D 25/145 |
| 9,266,568 | B2 * | 2/2016 | Nishino | B62D 25/2045 |
| 9,643,659 | B2 * | 5/2017 | Ohigashi | B62D 25/2036 |
| 10,399,607 | B2 * | 9/2019 | Sasakura | B62D 25/2018 |
| 10,532,777 | B2 * | 1/2020 | Lee | B62D 25/2027 |
| 11,919,382 | B2 * | 3/2024 | Mukumoto | B62D 25/20 |
| 2005/0208798 | A1 * | 9/2005 | Shimoda | H01R 13/6581 439/98 |
| 2014/0346815 | A1 * | 11/2014 | Keutz | H01F 38/14 296/193.07 |
| 2015/0375623 | A1 | 12/2015 | Galamb | |
| 2020/0406803 | A1 * | 12/2020 | Hernandez Covarrubias | D06N 3/14 |

(Continued)

FOREIGN PATENT DOCUMENTS

| | | |
|---|---|---|
| JP | H06-219336 A | 8/1994 |
| JP | 2002291113 A * | 10/2002 |

(Continued)

*Primary Examiner* — Steve Clemmons
(74) *Attorney, Agent, or Firm* — Dinsmore & Shohl LLP

(57) ABSTRACT

Provided is a structure of the floor of a vehicle having a battery pack mounted on the lower side of the floor, the structure including a floor panel constituting the floor; a floor tunnel extending in the front-rear direction of the vehicle on the middle portion of the floor panel; a lower dash panel disposed in front of the floor panel and the floor tunnel; and an electromagnetic wave shielding panel covering a corner where the floor panel, the floor tunnel, and the lower dash panel are connected to each other.

15 Claims, 6 Drawing Sheets

(56) References Cited

U.S. PATENT DOCUMENTS

2021/0036282 A1\* 2/2021 Junghans ............ H01M 50/222
2021/0162907 A1\* 6/2021 Hernandez Covarrubias ..............
B60R 13/0815

FOREIGN PATENT DOCUMENTS

| JP | 2012192893 A | \* | 10/2012 | |
|---|---|---|---|---|
| JP | 2018-030513 A | | 3/2018 | |
| JP | 6607478 B1 | \* | 11/2019 | |
| JP | 2020100372 A | \* | 7/2020 | ............... B60K 1/00 |
| WO | WO-2010041320 A1 | \* | 4/2010 | ............... B60L 5/005 |

\* cited by examiner

FLOOR STRUCTURE

CROSS REFERENCE TO RELATED APPLICATION

This application claims priority to Japanese Patent Application No. 2021-077801 filed on Apr. 30, 2021, which is incorporated herein by reference in its entirety including the specification, claims, drawings, and abstract.

TECHNICAL FIELD

The present disclosure relates to a structure of the floor of a vehicle having a battery pack mounted on the lower side of the floor, and in particular, a structure for shielding electromagnetic waves.

BACKGROUND

Battery electric vehicles and hybrid electric vehicles each have a relatively large battery pack for supplying power to a driving motor. At the same time, such vehicles are desired to ensure a largest possible space for the vehicle cabin. This often leads to a battery pack being mounted below the floor (underfloor) of the vehicle cabin, as described in JP H06-219336A.

Provided that the distance from the ground surface to the lower face of the battery pack is fixed, the thickness of the battery pack (the height of the battery cells stored) from the lower face, the position of the floor, and the positions of occupants are determined sequentially from the bottom. A vehicle platform with lower positions of occupants allows a larger freedom in designing vehicles, and use of such a platform as a so-called common platform enables a variety of vehicle designs. A high voltage wire for sending power from a wire connecting the battery cells in the battery pack to outside the battery pack is connected to either an inverter or a high voltage branch box to send an electric current to the motor as a driving source. To minimize the length of an expensive high voltage wire, a connector needs to be attached to the front end of the battery pack so that the battery pack are connected to the inverter at the shortest distance.

With this disposition, the connector is located just below where the feet of an occupant in the front seat are to be placed, that is, near the position below the feet with the floor panel in-between. This positional relationship requires provision of a steel plate covering the position below the feet in order to shield the electromagnetic waves or a shielding structure for the connector or the high voltage wire, in the case that current noise is caused from the high voltage wire. This, however, can increase the number of prototypes and/or tests, the weight of a vehicle, and/or costs.

SUMMARY

The structure of a floor according to the present disclosure is a structure of the floor of a vehicle having a battery pack mounted on the lower side of the floor, the structure including: a floor panel constituting the floor; a floor tunnel extending in the front-rear direction of the vehicle on the middle portion of the floor panel; a lower dash panel disposed in front of the floor panel and the floor tunnel; and an electromagnetic wave shielding panel covering a corner where three members, namely, the floor panel, the floor tunnel, and the lower dash panel, are connected to each other.

The electromagnetic wave shielding panel may cover a welded portion where the three members, namely, the floor panel, the floor tunnel, and the lower dash panel, are placed one on the other in the top view and then spot-welded.

The electromagnetic wave shielding panel may further extend in the right-left direction of the vehicle, so that this extended portion of the electromagnetic wave shielding panel covers a welded portion where two members, namely, the floor panel and the lower dash panel, are placed one on the other and spot-welded.

The electromagnetic wave shielding panel may cover three spot-welded portions, including one welded portion where the three members are placed one on the other and spot-welded and two welded portions each where the two members are placed one on the other and spot-welded.

The electromagnetic wave shielding panel may extend forward and upward of the vehicle until a position in front of the lower dash panel, the position being covered with an instrument panel suspended from above.

According to the present disclosure, electromagnetic waves near the feet of an occupant can be shielded with a relatively simple structure.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described based on the drawings. Note that the present disclosure is not limited to the embodiment described below.

<Complete Structure>

Figure 1:
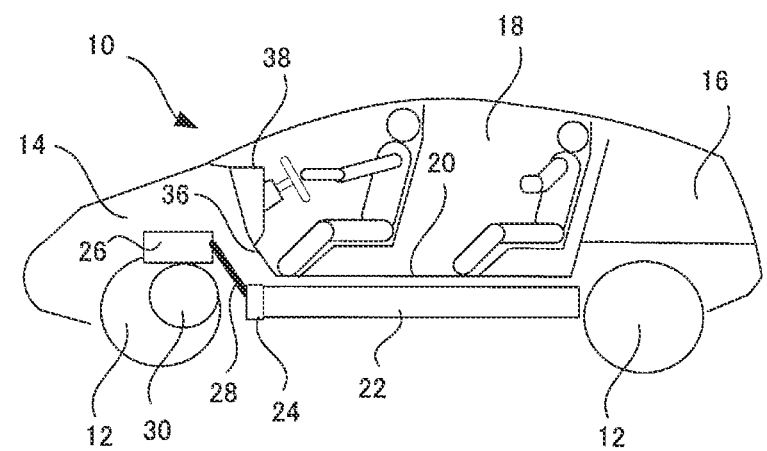
FIG. 1 schematically illustrates the complete structure of a vehicle.

FIG. 1 schematically illustrate the complete structure of a vehicle. In this example, a vehicle 10 has four wheels 12, an engine compartment 14 at the front, a luggage area 16 at the rear, and a vehicle cabin 18 in the middle of the vehicle. The vehicle cabin 18 has a floor panel 20 disposed on the floor. A battery pack 22 is disposed on the lower side of the floor panel 20.

A wire for connecting the battery cells in the battery pack 22 and a connector 24 for connecting the battery cells to outside the battery pack 22 are disposed in front of the battery pack 22.

The engine compartment 14 accommodates an equipment box 26 where an inverter, a high voltage branch, and so forth are stored. The equipment box 26 is connected to the connector 24 via a high voltage cable 28.

The equipment box 26 is also connected to a driving motor 30, so that the power from the battery pack 22 is supplied via the inverter inside the equipment box 26 to the driving motor 30. The driving motor 30 is mechanically connected to the wheels 12. The inverter is controlled depending on the amount of an acceleration operation to thereby control the output of the driving motor 30, so that the vehicle runs with a driving force from the driving motor 30.

A dash panel 36 is disposed in front of where the feet of an occupant are to be placed, separating the vehicle cabin 18 and the engine compartment 14 in the front. An instrument panel 38, where gauges are mounted, is disposed between the dash panel 36 and a wind shield glass above the dash panel 36.

<Electromagnetic Wave Shielding Panel>

Figure 2:
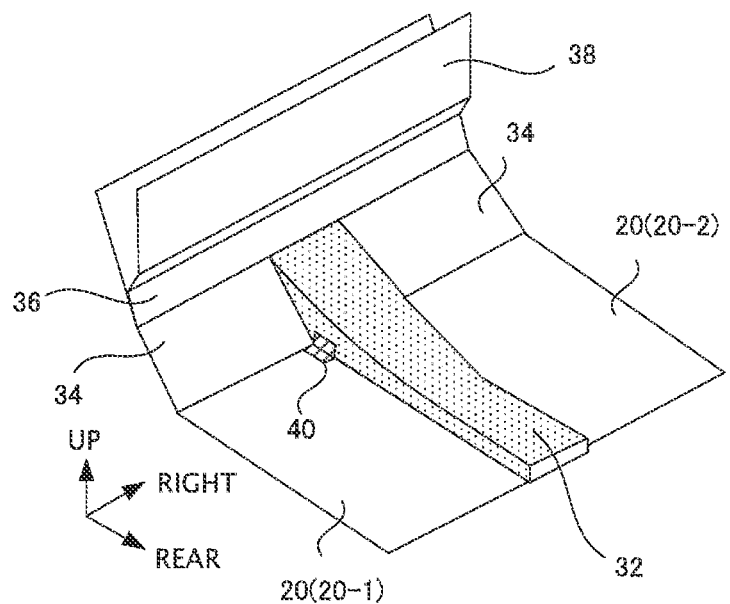
FIG. 2 is a perspective view of a schematic structure of the floor inside a vehicle cabin.

FIG. 2 is a schematic perspective view of a structure of the floor inside the vehicle cabin, specifically illustrating a floor on the side of the front seats in the vehicle cabin. The floor panel 20 is divided into a right floor panel 20-2 on the side of the right seats and a left floor panel 20-1 on the side of the left seats, and the respective floor panels 20-1, 20-2 are disposed below the right and left respective front seats inside the vehicle cabin. A lower dash panel 34 is disposed in front of the floor panel 20 so as to stand diagonally slightly upward. The lower dash panel 34 as well is divided into a sub-panel on the side of the right seats and a sub-panel on the side of the left seats. A floor tunnel 32 is disposed between (in the middle of) the right floor panel 20-2 and the right lower dash sub-panel of the lower dash panel 34 and the left floor panel 20-1 and the left lower dash sub-panel of the lower dash panel 34, so as to extend in the front-rear direction of the vehicle. The floor tunnel 32 protrudes upward exceeding the right and left floor panels 20-1, 20-2 and the right and left lower dash sub-panels of the lower dash panel 34. The floor tunnel 32 is hollow such that the inside space has a rectangular cross section and is open downward. Cables or the like are stored in the inside space of the floor tunnel 32. The dash panel 36 is disposed at the front ends of the floor panel 20, the lower dash panel 34, and the floor tunnel 32, and extends upward to thereby separate the engine compartment 14 in the front and the vehicle cabin 18 (refer to FIG. 1). The instrument panel 38 hangs downward such that the lower portion of the instrument panel 38 covers the upper portion of the dash panel 36.

The floor panel 20, the lower dash panel 34, and the floor tunnel 32 are connected to each other at a corner, where a metal electromagnetic wave shielding panel 40 is disposed. Note that in this example, the floor panel 20, the lower dash panel 34, and the floor tunnel 32 are stacked up in this order from the bottom at the corner such that these three members appear placed one on the other in a top view, and the electromagnetic wave shielding panel 40 is disposed on these three stacked components and then spot-welded.

Note that although only the electromagnetic wave shielding panel 40 on the side of the left seats is illustrated, an electromagnetic wave shielding panel 40 is better provided at the corresponding corner on the side of the right seats. Alternatively, in a case where the high voltage cable 28 is disposed one-sided inside the floor tunnel 32, the electromagnetic wave shielding panel 40 can be disposed only at a corner on the side closer to the high voltage cable 28. Alternatively, since a driver is normally present in the cabin when driving, the electromagnetic wave shielding panel 40 can be provided only on the side of the driver seat.

Figure 3:
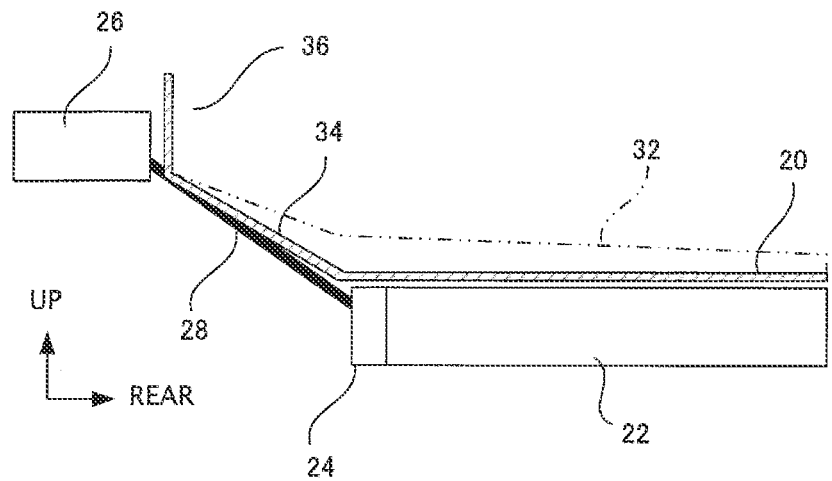
FIG. 3 is a schematic cross sectional view of the front lower portion of the vehicle cabin, viewed from the lateral side.

FIG. 3 is a schematic cross sectional view of the front lower portion of the vehicle cabin, viewed from the lateral side. The battery pack 22 is disposed below the floor panel 20, and the connector 24 attached to the front portion of the battery pack 22 is connected to the equipment box 26 with the high voltage cable 28, which is illustrated with a thick black line in the drawing. The middle portion of the high voltage cable 28 between the equipment box 26 and the connector 24 runs inside the floor tunnel 32, which is illustrated with a long dashed double-short dashed line in the drawing.

Figures 4A, 4B:
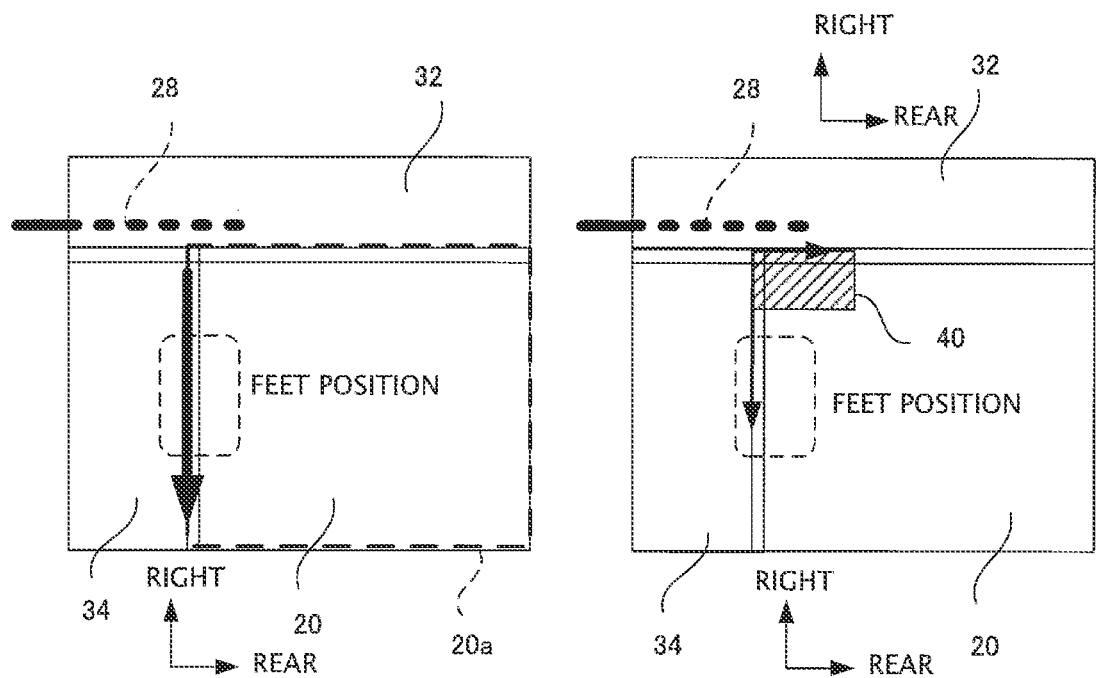
FIG. 4A is a plan view showing a current flowing in the front lower portion (a left half) of the vehicle cabin, with no electromagnetic wave shielding panel 40 provided.
FIG. 4B is a plan view showing a current flowing in the front lower portion (a left half) of the vehicle cabin, with an electromagnetic wave shielding panel 40 provided.

FIG. 4A and FIG. 4B are plan views illustrating a current flowing in the lower front portion (left half) of the vehicle cabin. FIG. 4A relates to a case where no electromagnetic wave shielding panel 40 is provided; FIG. 4B relates to a case where an electromagnetic wave shielding panel 40 is provided. As illustrated in FIG. 4A, the current (high frequency noise) flowing in the high voltage cable 28 generates a magnetic field, which induces a current flowing along the lower end of the lower dash panel 34. The induced current shunts via a spot-welded portion (welded point) to the front end edge of the floor panel 20, so that electromagnetic waves due to this current are irradiated inside the vehicle cabin. As the front end edge of the floor panel 20 corresponds to a position where the feet of an occupant are to be placed, as illustrated, radiation of electromagnetic waves from the front end edge are can be reduced.

In this embodiment, as illustrated in FIG. 4B, a metal electromagnetic wave shielding panel 40 is disposed at a corner where three members, such as the floor panel 20, the lower dash panel 34, and the floor tunnel 32, are connected to each other. Hence, the current induced by the high frequency noise of the high voltage cable 28 partially shunts and flows to the end portion of the electromagnetic wave shielding panel 40 along the floor tunnel 32. This reduces the current flowing toward the position where the feet of an occupant are to be located, so that radiation of electromagnetic waves can be reduced.

In other words, electromagnetic waves from the connector 24 and/or the high voltage cable 28 below the floor panel 20 and the floor tunnel 32 generate eddy current in a direction blocking the magnetic field due to the shielding effect implemented with the floor panel 20, the lower dash panel 34, and the floor tunnel 32, which are made of metal (a steel plate in this example), and the eddy current generates a magnetic field in the vehicle cabin. In an area along the front end portion of the floor panel 20, as the current flows in the same direction as the edge direction of the front end portion, a relatively strong magnetic field is formed. In particular, along the front end of the floor panel 20 and the lower end edge of the lower dash panel 34, the current likely flows in the right-left direction (the width direction) of the vehicle. To address the above, in this embodiment, the electromagnetic wave shielding panel 40 is provided to reduce the current flowing along the edge, to thereby prevent radiation of electromagnetic waves inside the vehicle cabin.

<Materials>

For reduction in weight, a high-tensile steel has been developed. A steel plate containing a component (Si or the like) to improve workability in formation increases the electric resistance of the steel plate. Employment of a high-tensile steel as a material of the lower dash panel 34 increases the shunt components flowing toward the floor panel 20 via a spot-welded point, which then increases the current flowing along the edge of the floor panel 20. To address the above, the electromagnetic wave shielding panel 40 is provided at the source portion (the connection point of the lower dash panel 34 and the floor tunnel 32, the point being near the connector 24) of the eddy current so that the current that flows to the front end edge of the floor panel 20 partially flows rearward via the electromagnetic wave shielding panel 40, that is, an increased amount of shunt components flow rearward, whereby the shunt components that flow toward the front end edge of the floor panel 20 are dispersed. Note that when the shunt components flowing rearward increase, the shunt components flowing forward also increase.

In this embodiment, the lower dash panel 34, extending in the right-left direction (the vehicle width direction) above the connector 24, is connected to the floor tunnel 32, extending in the front-rear direction of the vehicle, such that the lower dash panel 34 and the floor tunnel 32 together define the letter T in a plan view of the vehicle. Then, on the left side of the floor tunnel 32 and behind the lower dash panel 34, the floor tunnel 32 and the left floor panel 20-1 are attached to each other at a substantially L-shaped flange portion formed on the front edge of the left floor panel 20-1 on a side closer to the middle of the vehicle. Further, on the right side of the floor tunnel 32 and behind the lower dash panel 34, the floor tunnel 32 and the right floor panel 20-2 are attached to each other at a substantially L-shaped flange portion formed on the front edge of the right floor panel 20-2 on a side closer to the middle of the vehicle.

In particular, at the angled portion (the front middle side) of the L-shaped flange of the floor panel 20 (20-1), the electromagnetic wave shielding panel 40 is attached to three members, namely, the lower dash panel 34, the floor tunnel 32, and the floor panel 20 (20-1), by spot welding. The dash panel 36 is disposed above the lower dash panel 34.

Note that the magnetic field generated near where the feet of an occupant are to be placed due to the current flowing along the front end portion of the floor panel 20 due to the current flowing in the high voltage cable 28 depends on the electrical resistivity (an inverse of an electrical conductivity) of the material of the floor or the like.

The magnetic field generated near where the feet of an occupant are to be placed is affected by the materials of the dash panel 36, the lower dash panel 34, the floor panel 20, the floor tunnel 32, and so forth.

Experimental Example 1: No Electromagnetic Wave Shielding Panel Provided

For example, (A) a low electrical resistive material (electrical resistivity: 14.3 μΩ·cm) equivalent to SPC 270 (a material name of a cold-rolled steel material) and (B) a high electrical resistive material equivalent to a high-tensile steel (electrical resistivity: 25.0 μΩ·cm) are selected, and magnetic fields generated near where the feet of an occupant are to be placed are measured under the conditions 1, 2 below.

Figure 5:
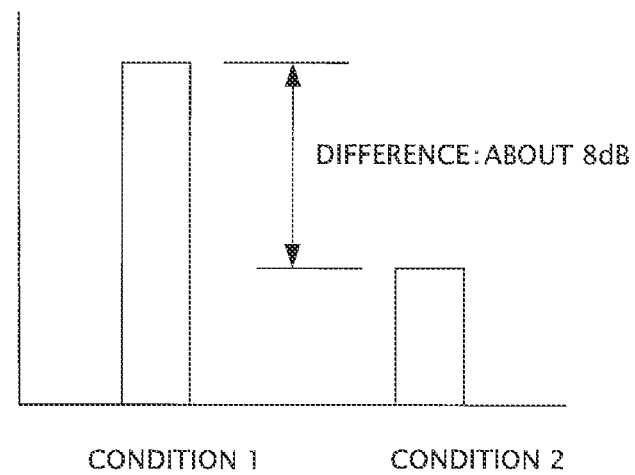
FIG. 5 is a graph showing the difference in strength of a magnetic field, attributed to the difference in material of the floor.

Condition 1: dash panel 36: A, lower dash panel 34: B, floor panel 20: A, floor tunnel 32: B
Condition 2: dash panel 36: A, lower dash panel 34: A, floor panel 20: A, floor tunnel 32: A The results are shown in FIG. 5. As shown, the condition 1 leads to a stronger magnetic field than the condition 2, with a difference of about 8 dB. This proves that use of a high-tensile steel for the lower dash panel 34 and the floor tunnel 32 increases the shunt components flowing toward the floor panel 20 from the lower dash panel 34 and the floor tunnel 32 via a spot welded point, which increases the current flowing along the edge of the floor panel 20.

Note that this embodiment employs the condition 1.

<Number of Welded Points on Electromagnetic Wave Shielding Panel>

Figure 6:
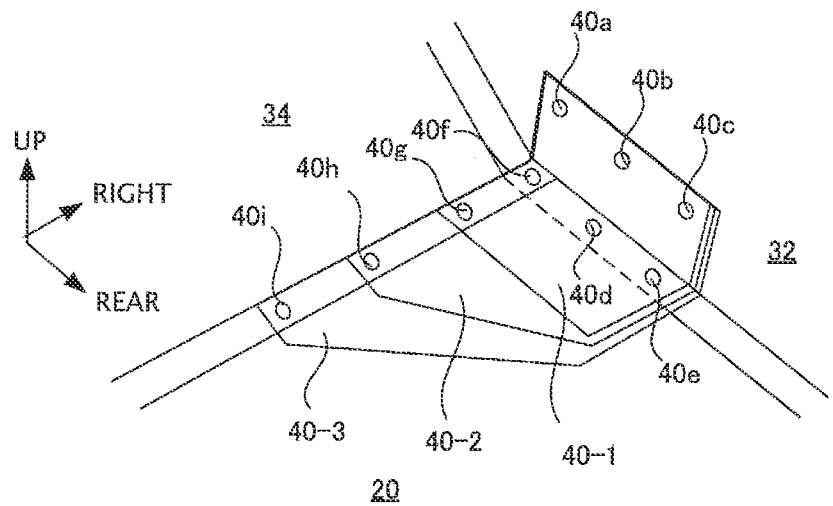
FIG. 6 illustrates an example including electromagnetic wave shielding panels 40 in different sizes.

FIG. 6 illustrates examples respectively using electromagnetic wave shielding panels 40 of a different size. Specifically, three electromagnetic wave shielding panels 40 having different shapes, namely, electromagnetic wave shielding panels 40-1, 40-2, 40-3, are used in this example. Although the three electromagnetic wave shielding panels 40-1, 40-2, 40-3 are illustrated being stacked up one on the other in FIG. 6, in actuality, each of these three is separately used in an experiment.

Each of the three electromagnetic wave shielding panels 40-1, 40-2, 40-3 abuts on the floor tunnel 32 on a side closer to the middle of the vehicle, and then bends upward so that the standing portion is welded to the floor tunnel 32 at three points aligned in the front-rear direction (three welded points 40a, 40b, 40c) near the upper end of the standing portion. In addition, each of the three electromagnetic wave shielding panels 40-1, 40-2, 40-3 is welded to both the left end portion (flange) of the floor tunnel 32 and the right end portion of the floor panel 20 at two points (two welded portions 40d, 40e) at a position immediately before, in a direction toward the middle of the vehicle, a location where the electromagnetic wave shielding panel 40-1, 40-2, 40-3 bends and stands upward. Further, each of the three electromagnetic wave shielding panels 40-1, 40-2, 40-3 is welded to the left end portion (flange) of the floor tunnel 32, the right front corner of the floor panel 20, and the right rear corner of the lower dash panel 34 at one point (one welded portion 40f) where the left end portion, the right front corner, and the right rear corner of the three respective components are placed one on the other (that is, at a corner where the three members are placed one on the other).

The three electromagnetic wave shielding panels 40-1, 40-2, 40-3 are different from each other in length in the right-left direction of the vehicle (in the vehicle width direction), thus respectively covering areas that are different in size, where the front end portion of the floor panel 20 and the rear end portion of the lower dash panel 34 are placed one on the other.

The electromagnetic wave shielding panel 40-1 is spot-welded to the front end portion of the floor panel 20 and the rear end portion of the lower dash panel 34 at one point (a welded portion 40g). The electromagnetic wave shielding panel 40-2 is spot-welded at two points (welded portions 40g, 40h). The electromagnetic wave shielding panel 40-3 are spot-welded at three points (welded portions 40g, 40h, 40i).

Since each of the three electromagnetic wave shielding panels 40-1, 40-2, 40-3 is welded at one point where the floor tunnel 32, the floor panel 20, and the lower dash panel 34 are placed one on the other, as described above, the three respective electromagnetic wave shielding panels 40-1,

40-2, 40-3 are welded to the floor panel 20 and the lower dash panel 34 at two, three, and four points, respectively.

Figure 7:
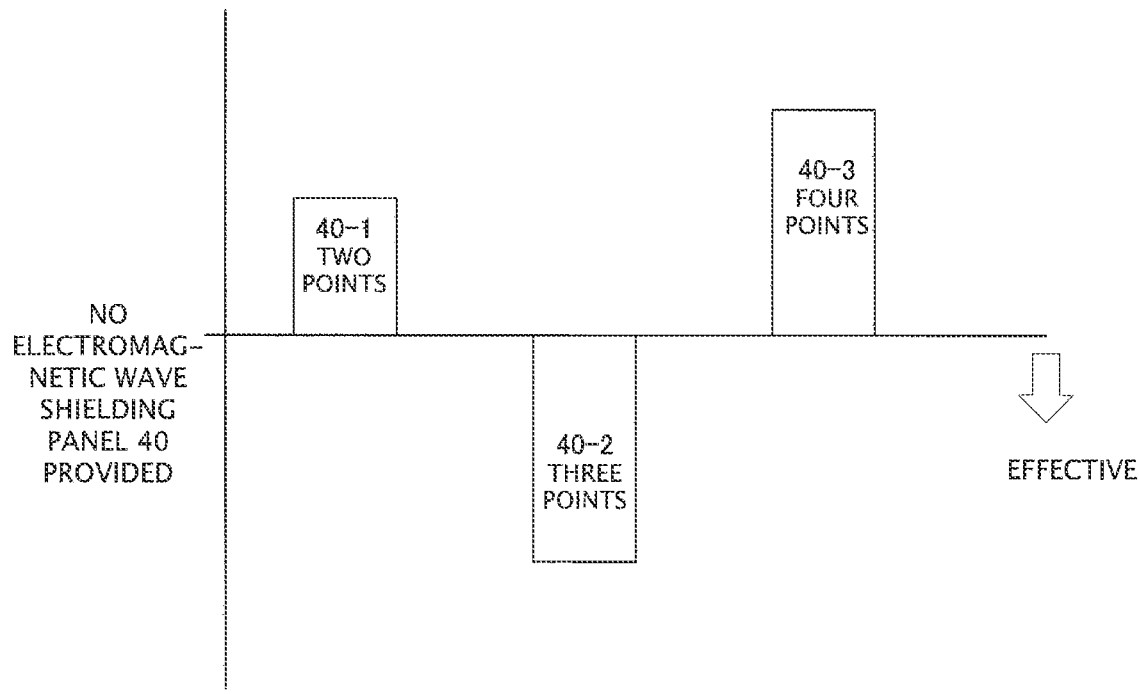
FIG. 7 shows varying strength of a magnetic field generated near where the feet of an occupant are to be placed, with respect to the electromagnetic wave shielding panels 40-1, 40-2, 40-3 illustrated in FIG. 6.

FIG. 7 is a graph showing the varying strength of a magnetic field generated near where the feet of an occupant are to be placed on the electromagnetic wave shielding panels 40-1, 40-2, 40-3. It is known from the graph that an odd number of welded spots leads to weaker strength of the magnetic field, that is, production of a reduction effect, while an even number of welded spots does not produce such an effect.

<Electrical Resistivity σ of Electromagnetic Wave Shielding Panel 40>

Figure 8:
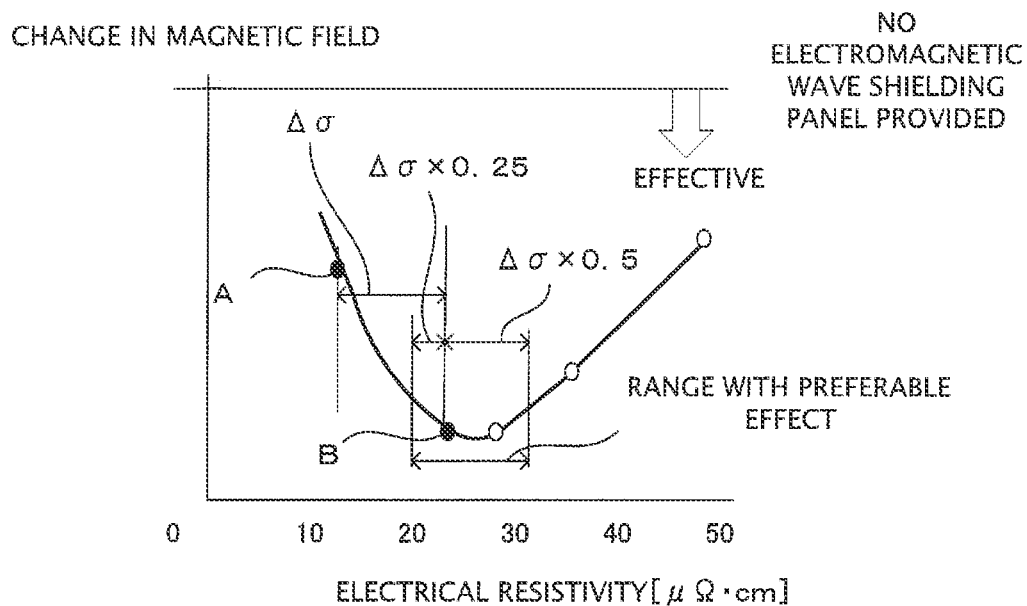
FIG. 8 is a graph showing a magnetic field shielding effect with respect to changing electrical resistivities in the case of using an electromagnetic wave shielding panel 40-2, which is welded to both the lower dash panel 34 the floor panel 20 at three points.

FIG. 8 is a graph showing a magnetic field shielding effect in response to changing electrical conductivity of the electromagnetic wave shielding panel 40 in the case of using the electromagnetic wave shielding panel 40-2, which is welded at three points to both the lower dash panel 34 made of a high-tensile steel that has an electrical resistivity of 25.0 μΩ·cm, and the floor panel 20 made of SPC 270 that has an electrical resistivity of 14.3 μΩ·cm.

The point A in the drawing corresponds to an electrical resistivity of 14.3 μΩ·cm, or an electrical resistivity equivalent to that of SPC 270, and the point B corresponds to an electrical resistivity of 25.0 μΩ·cm, or an electrical resistivity equivalent to that of a high-tensile steel. It is known from the graph that, in the case where the electrical resistivity of the electromagnetic wave shielding panel 40 is equivalent to that of a high-tensile steel (B), similar to the lower dash panel 34, a large reduction effect is produced. In contrast, in the case where the electrical resistivity of the electromagnetic wave shielding panel 40 is equivalent to that of SPC 270, similar to the floor panel 20, only a small reduction effect is produced.

As described above, employment of an electromagnetic wave shielding panel having an electrical resistivity that is similar to that of the lower dash panel 34 makes it possible to reduce a magnetic field to be generated where the feet of an occupant are to be placed.

As to the range of electrical resistivities smaller than the electrical resistivity (B) of a high-tensile steel, electrical resistivities in the range up to 0.25 times the difference between the electrical resistivities (A) of a high-tensile steel and (B) of SPC270, that is, (Δσ=B−A), from the electrical resistivity (B) of a high-tensile steel, produce a greater reduction effect. Meanwhile, as to the range of electrical resistivities larger than the electrical resistivity (B) of a high-tensile steel, electrical resistivities in the range up to 0.5 times the difference (Δσ=B−A) from the electrical resistivity (B) of a high-tensile steel produce a greater reduction effect. That is, the range with desirable effect is from the point of (B) −0.25Δσ to the point of (B)+0.5Δσ.

Figure 9:
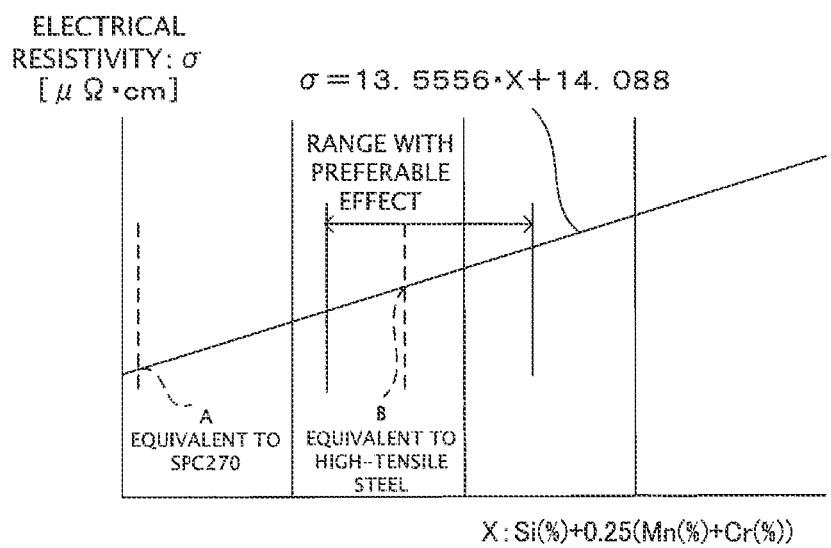
FIG. 9 illustrates the relationship between an electrical resistivity of steel material and the ratio of components between silicon (Si), manganese (Mn), and chromium (Cr)

Note here that it is known that an electrical resistivity of steel material depends on the respective amounts of silicon (Si), manganese (Mn), and chromium (Cr) contained in the steel material (refer to Sumitomo Metal Technical Reports, vol. 33, no 4, 1981 "Spot Weldability of High-Tensile Thin Steel"). FIG. 9 shows the relationship between the electrical resistivity σ of steel material and a component ratio between silicon (Si), manganese (Mn), and chromium (Cr).

$$\sigma = 13.5556 \cdot X + 14.088$$

Here, X=Si (%)+0.25(Mn (%)+Cr (%)), σ: electrical resistivity (μΩ·cm).

Based on the above, a component ratio of the electromagnetic wave shielding panel 40 that produces a magnetic field reduction effect can be determined, as shown in FIG. 9. That is, a steel material having the above-described electrical resistivity is selected to form the electromagnetic wave shielding panel 40, based on the composition (the component ratio % between Si, Mn, Cr) of the material.

Note that in the above-described example, an electrical resistivity σ that produces a reduction effect is in the range from 22.3 to 30.4 μΩ·cm, and X is in the range from 0.6 to 1.2.

Another Embodiment

Figure 10:
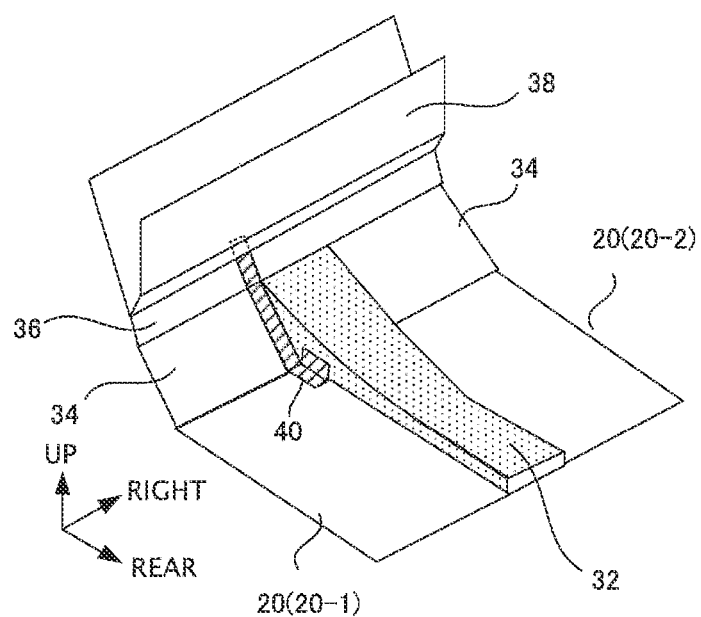
FIG. 10 illustrates another exemplary structure of the electromagnetic wave shielding panel 40.

FIG. 10 illustrates another exemplary structure of the electromagnetic wave shielding panel 40. In this example, the front end portion of the electromagnetic wave shielding panel 40 extends to below the instrument panel 38. The front end portion of the electromagnetic wave shielding panel 40 may extend further forward below the instrument panel 38, as indicated by the dotted line in the drawing, or on the surface of the instrument panel 38.

As an occupant does not normally place their feet on the instrument panel 38, which is a panel suspended from above, extension of the electromagnetic wave shielding panel 40 to the instrument panel 38 can sufficiently reduce a magnetic field to be generated near where the feet of an occupant are to be placed.

The invention claimed is:

1. A structure of a floor of a vehicle having a battery pack mounted on a lower side of a floor, comprising:
   a floor panel constituting the floor;
   a floor tunnel extending in a front-rear direction of the vehicle on a middle portion of the floor panel;
   a lower dash panel disposed in front of the floor panel and the floor tunnel; and
   an electromagnetic wave shielding panel covering a corner where three members, namely, the floor panel, the floor tunnel, and the lower dash panel, are connected to each other, the electromagnetic wave shielding panel is welded to the floor tunnel.

2. The floor structure according to claim 1, wherein the electromagnetic wave shielding panel covers a welded portion where the three members, namely, the floor panel, the floor tunnel, and the lower dash panel, are placed one on the other in a top view and then spot-welded.

3. The floor structure according to claim 2, wherein the electromagnetic wave shielding panel further extends in a right-left direction of the vehicle, so that this extended portion of the electromagnetic wave shielding panel covers a welded portion where two members, namely, the floor panel and the lower dash panel, are placed one on the other and spot-welded.

4. The floor structure according to claim 3, wherein the electromagnetic wave shielding panel covers three spot-welded portions, namely, one welded portion where the three members are placed one on the other and spot-welded, and two welded portions, each where the two members are placed one on the other and spot-welded.

5. The floor structure according to claim 1, wherein the electromagnetic wave shielding panel extends forward and upward of the vehicle until a position in front of the lower dash panel, the position being covered with an instrument panel suspended from above.

6. The floor structure according to claim 1, wherein the electromagnetic wave shielding panel comprises a bent portion that abuts the floor tunnel and that the bent portion is welded to the floor tunnel.

7. The floor structure according to claim 6, wherein the electromagnetic wave shielding panel is welded at one point where the floor panel, the floor tunnel, and the lower dash panel are positioned one on the other, as viewed from a top view.

8. A structure of a floor of a vehicle having a battery pack mounted on a lower side of a floor, comprising:
   a floor panel constituting the floor;
   a floor tunnel extending in a front-rear direction of the vehicle on a middle portion of the floor panel;
   a lower dash panel disposed in front of the floor panel and the floor tunnel; and
   an electromagnetic wave shielding panel covering a corner where three members, namely, the floor panel, the floor tunnel, and the lower dash panel, are connected to each other, the electromagnetic wave shielding panel is welded at one point where the floor panel, the floor tunnel, and the lower dash panel are positioned one on top of the other, as viewed from a top view.

9. The floor structure according to claim 8, wherein the electromagnetic wave shielding panel covers a welded portion where the three members, namely, the floor panel, the floor tunnel, and the lower dash panel, are placed one on the other in the top view and then spot-welded.

10. The floor structure according to claim 9, wherein the electromagnetic wave shielding panel further extends in a right-left direction of the vehicle, so that this extended portion of the electromagnetic wave shielding panel covers a welded portion where two members, namely, the floor panel and the lower dash panel, are placed one on the other and spot-welded.

11. The floor structure according to claim 10, wherein the electromagnetic wave shielding panel covers three spot-welded portions, namely, one welded portion where the three members are placed one on the other and spot-welded, and two welded portions, each where the two members are placed one on the other and spot-welded.

12. The floor structure according to claim 8, wherein the electromagnetic wave shielding panel extends forward and upward of the vehicle until a position in front of the lower dash panel, the position being covered with an instrument panel suspended from above.

13. The floor structure according to claim 8, wherein the electromagnetic wave shielding panel comprises a bent portion that abuts the floor tunnel and that the bent portion is welded to the floor tunnel.

14. A structure of a floor of a vehicle having a battery pack mounted on a lower side of a floor, comprising:
   a floor panel constituting the floor;
   a floor tunnel extending in a front-rear direction of the vehicle on a middle portion of the floor panel;
   a lower dash panel disposed in front of the floor panel and the floor tunnel; and
   an electromagnetic wave shielding panel covering a corner where three members, namely, the floor panel, the floor tunnel, and the lower dash panel, are connected to each other, the electromagnetic wave shielding panel covers only a portion of the floor panel at the corner where the floor panel, the floor tunnel, and the lower dash panel are connected, and the remainder of the floor panel is uncovered by the electromagnetic wave shielding panel.

15. The floor structure according to claim 14, wherein the electromagnetic wave shielding panel covers a welded portion where the three members, namely, the floor panel, the floor tunnel, and the lower dash panel, are placed one on the other in a top view and then spot-welded.

* * * * *